United States Patent

Jo et al.

[11] Patent Number: 5,932,994
[45] Date of Patent: Aug. 3, 1999

[54] SOLAR CELL POWER SOURCE DEVICE

[75] Inventors: Hyun-min Jo, Pucheon; Yong-ho Kim, Seoul, both of Rep. of Korea

[73] Assignee: Samsung Electronics, Co., Ltd., Suwon, Rep. of Korea

[21] Appl. No.: 08/853,379

[22] Filed: May 8, 1997

[30] Foreign Application Priority Data

May 15, 1996 [KR] Rep. of Korea ............... 96/16308

[51] Int. Cl.⁶ .................................................. G05F 5/00
[52] U.S. Cl. .................... 323/222; 323/285; 323/299; 323/906; 363/79
[58] Field of Search .................................. 323/222, 282, 323/283, 284, 285, 290, 299, 906; 363/79, 80

[56] References Cited

U.S. PATENT DOCUMENTS

| | | | |
|---|---|---|---|
| 4,580,090 | 4/1986 | Bailey et al. | 323/906 X |
| 4,649,334 | 3/1987 | Nakajima | 323/299 |
| 4,873,480 | 10/1989 | Lafferty | 323/906 X |
| 4,916,382 | 4/1990 | Kent | 323/299 |
| 5,268,832 | 12/1993 | Kandatsu | 363/95 |
| 5,327,071 | 7/1994 | Frederick et al. | 323/299 |
| 5,654,883 | 8/1997 | Takehara et al. | 363/79 |
| 5,682,305 | 10/1997 | Kurokami et al. | 363/79 |
| 5,747,967 | 5/1998 | Muljadi et al. | 320/39 |

OTHER PUBLICATIONS

U.S. application No. 08/839,865, Jo et al., filed Apr. 22, 1997.

*Primary Examiner*—Peter S. Wong
*Assistant Examiner*—Y. J. Han
*Attorney, Agent, or Firm*—Marger, Johnson & McCollom, P.C.

[57] ABSTRACT

A solar cell power source device is disclosed which optimizes the power output of the solar cell by detecting a maximum power point of the solar cell and controlling the duty cycle of a switching transistor in a switching power converter such that the output current of the solar cell follows the maximum power point. Also shown is a pulse width modulation controller which multiplies the output voltage of the solar cell by the output current of the solar cell to obtain a power detecting signal, samples the power detecting signal during two different sample periods to determine if the power output is decreasing, and modulating the pulses output to the switching transistor of the switching power converter in order to maintain the power output of the solar cell at the maximum power point.

15 Claims, 6 Drawing Sheets

5,932,994

SOLAR CELL POWER SOURCE DEVICE

FIELD OF THE INVENTION

The present invention relates to solar cell power source devices, and more particularly to a solar cell power source device which is capable of following a maximum power point by varying the current drawn from the solar cell according to the strength of solar light incident upon the solar cell and to the ambient temperature of the solar cell.

BACKGROUND OF THE INVENTION

In one aspect of utilizing solar energy, a solar cell is used to convert solar energy into electric energy. The power of the solar cell differs according to the strength of a solar light incident upon the solar cell and to an ambient temperature, as indicated in FIGS. 1 and 2. These variations in the power bring about a change in an output impedance of the solar cell. If a fixed load is driven by the solar cell, impedance mismatching occurs and the efficiency of the power transfer to the load is lowered. Hence, efforts have been made to maximize the power transfer efficiency.

In U.S. Pat. No. 4,873,480, incorporated herein by reference, a cell array and an independent cell are installed in a solar cell panel, as shown in FIG. 3. A reference voltage is generated through the independent cell, and a pulse width modulation signal is generated by comparing the reference voltage with an output voltage of the cell array. The power supplied to a load is switched in response to pulse width modulation signal. Therefore, the output voltage of the solar cell is maintained at a constant voltage level irrespective of the strength of the solar light or the ambient temperature.

However, a technique such as that disclosed in the above U.S. Pat. No. 4,873,480 causes slight variations in the output voltage in order to obtain the maximum power point for the level of solar light, as indicated in FIG. 1. Although the efficiency is better than when a constant reference voltage is used, it is difficult to transfer the maximum power at every condition, and an additional independent cell should be provided.

To compensate for variations in the output voltage of a solar cell due to ambient temperature fluctuations, U.S. Pat. No. 4,580,090, incorporated herein by reference, utilizes a thermistor for detecting the output voltage of the solar cell and compensating the detected voltage for temperature, as shown in FIG. 4. However, the output voltage of the solar cell is detected by dividing the voltage through resistors, and the temperature is compensated by using the thermistor connected in series with these resistors. Therefore, if the solar light is very weak, the overall efficiency is lowered.

In U.S. Pat. No. 4,916,382, incorporated herein by reference, the output voltage and current of the solar cell are converted to digital data through an analog-to-digital converter, as shown in FIG. 5. The digital data obtained is processed by a controller to calculate and store the maximum power point. However, such a technique requires complicated circuitry due to the input power measurement interface circuit needed for the controller, which raises the cost.

SUMMARY OF THE INVENTION

It is therefore an object of the present invention to provide a solar cell power source device which is capable of following up a maximum power point irrespective of the strength of a solar light and an ambient temperature.

It is another object of the present invention to provide a solar cell power source device for simplifying a circuit construction.

A solar cell power source device embodying the present invention includes: a solar cell for converting solar energy into electric energy to generate a DC voltage; a chopper circuit for receiving the DC voltage of the solar cell and converting the DC voltage of the solar cell into a prescribed DC voltage; a battery for charging the DC voltage of the chopper circuit; and a pulse width modulation controller for receiving the output voltage and output current of the solar cell, detecting a maximum power point of the solar cell, and controlling the chopper circuit so as to maintain the DC voltage of the chopper circuit at a constant level by causing the output current of the solar cell to follow up the detected maximum power point.

DETAILED DESCRIPTION OF PREFERRED EMBODIMENT

Figure 1:
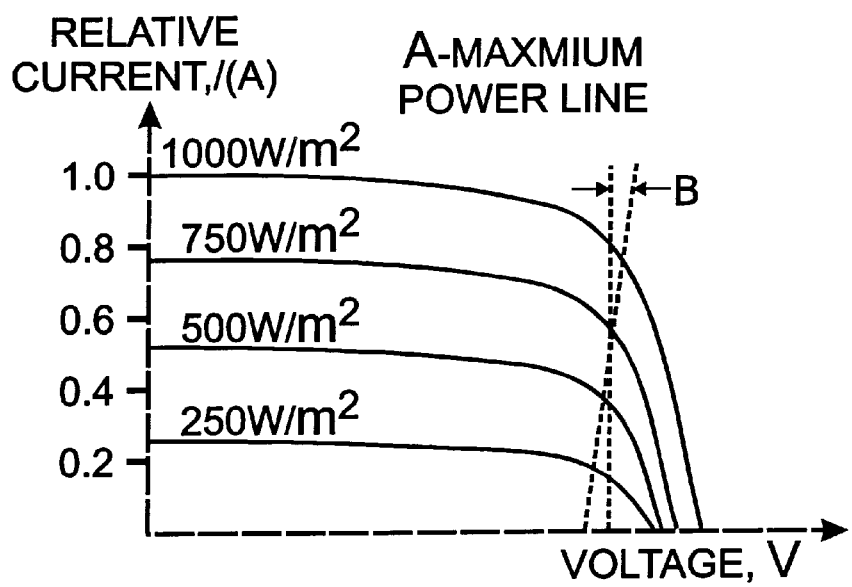
FIG. 1 is a graph showing output voltage and current characteristics relative to the strength of a solar light incident upon a solar cell.
Figure 2:
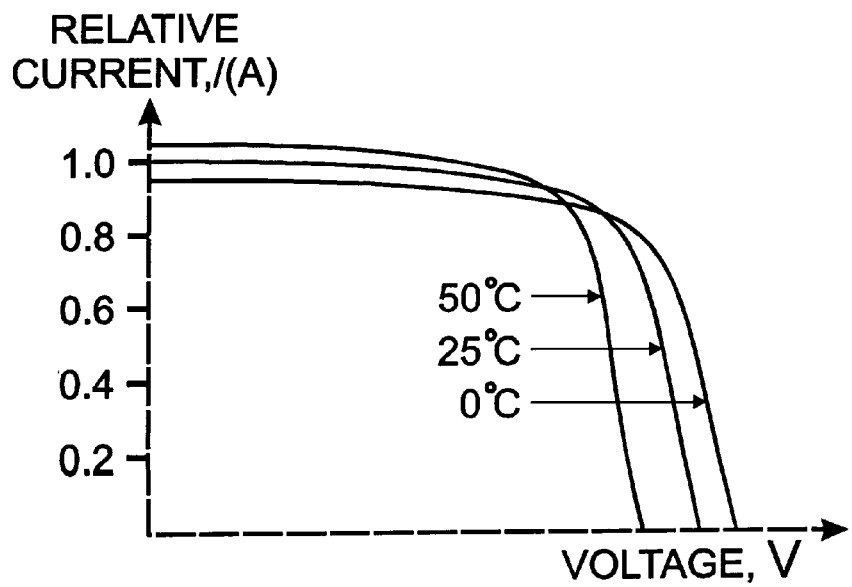
FIG. 2 is a graph showing output voltage and current characteristics relative to an ambient temperature of a solar cell.
Figure 3:
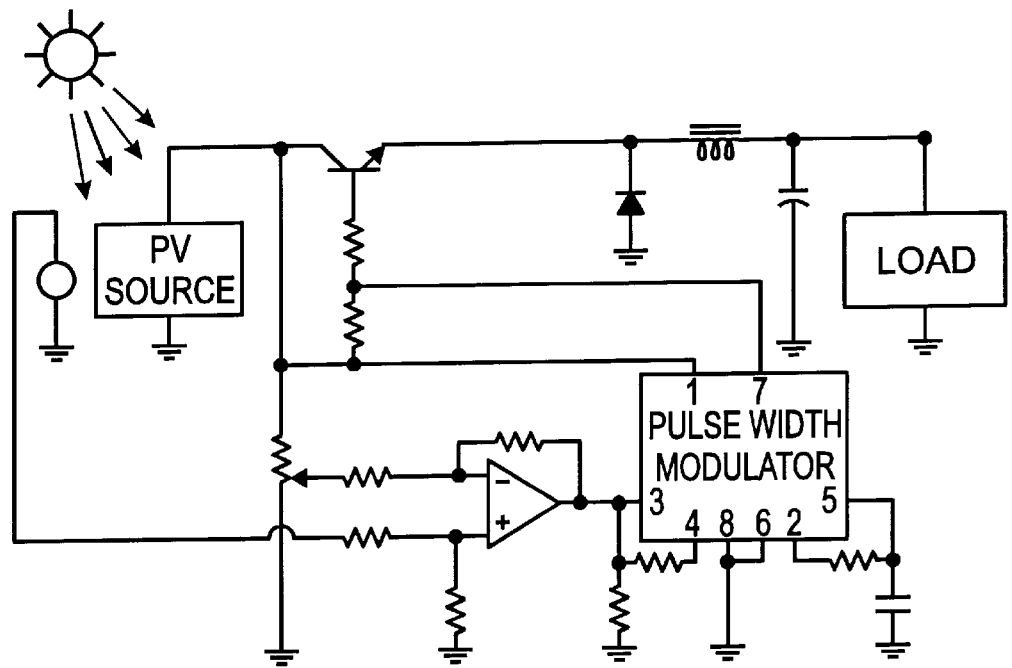
FIG. 3 is a block diagram of a conventional maximum power follow-up apparatus.
Figure 4:
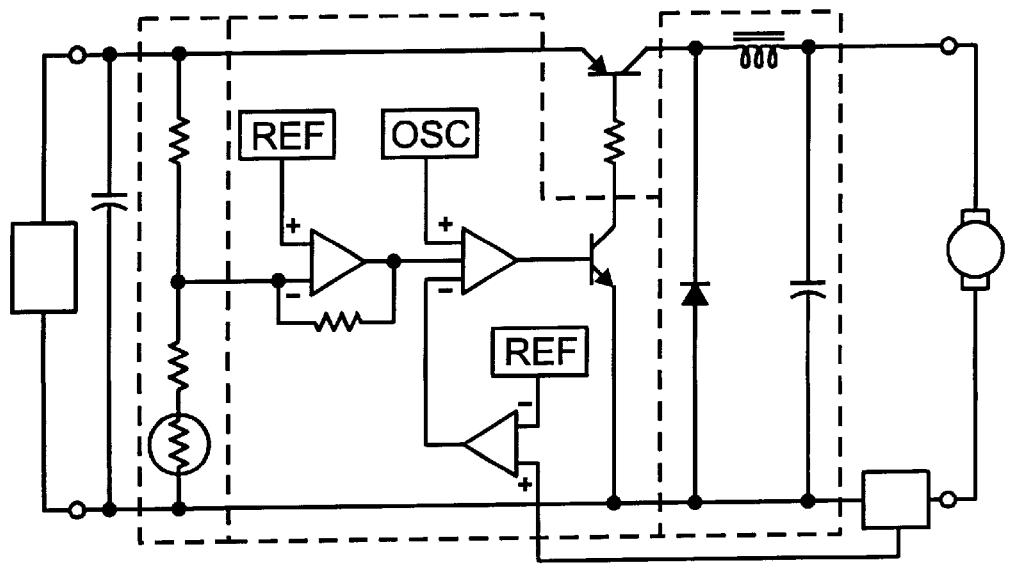
FIG. 4 is a block diagram of a conventional system for maximizing the efficiency of power transmission that includes temperature compensation.
Figure 5:
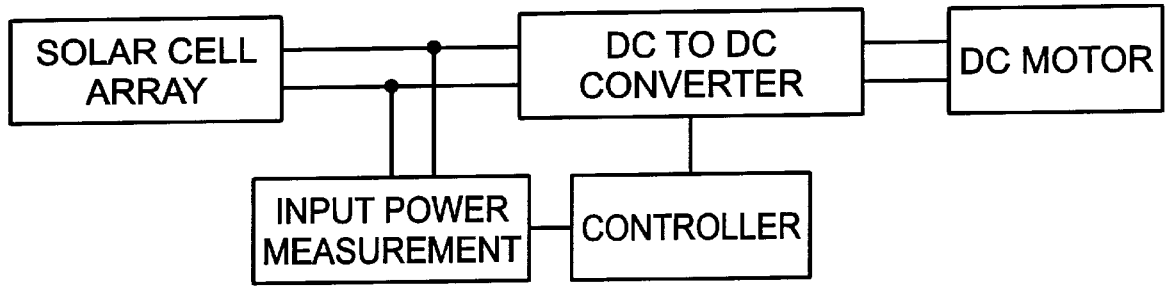
FIG. 5 is a block diagram of a prior art solar energy system to which a variable impedance matching circuit is combined to improve the conversion efficiency of a photo-electric cell power source.
Figure 6:
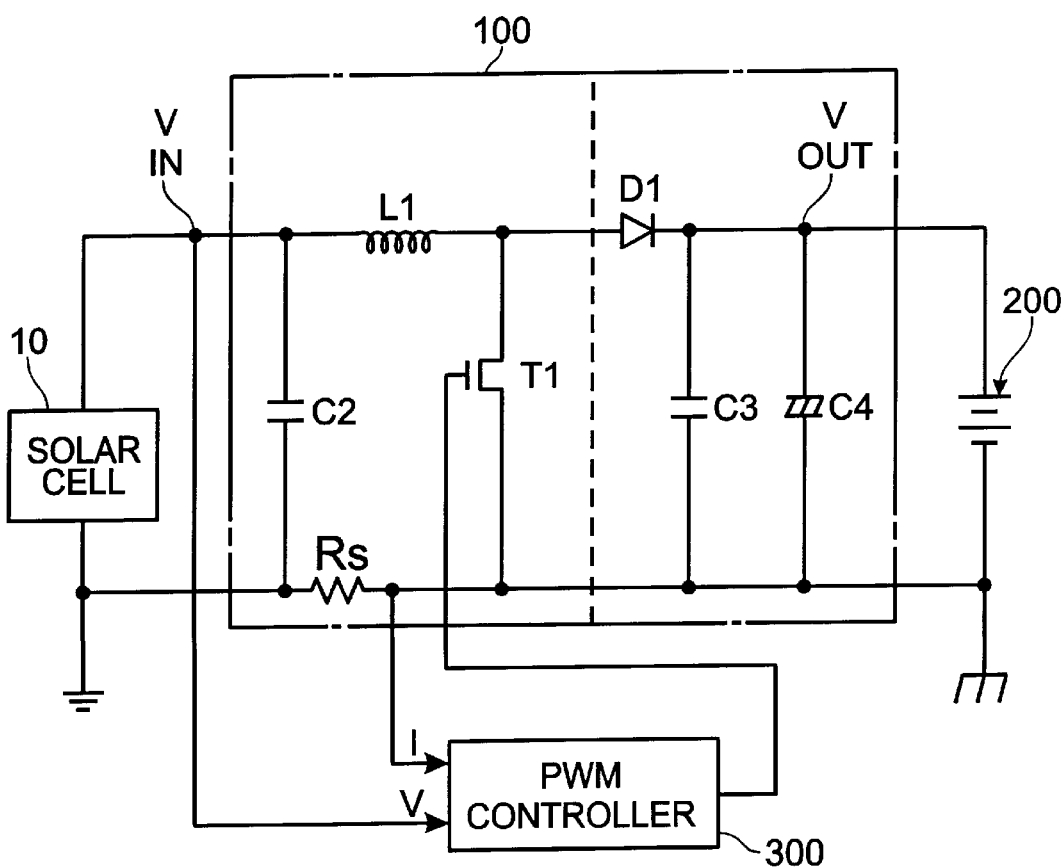
FIG. 6 is a circuit diagram of an embodiment of a solar cell power source device according to the present invention.

Referring to FIG. 6, an embodiment of a solar cell power source device according to the present invention includes a solar cell or solar cell array 10, a chopper circuit 100, which receives an input voltage Vin from solar cell 10 and converts Vin into a boosted DC output voltage Vout, a battery 200 which is charged by Vout, and a pulse width modulation (PWM) controller 300, which receives Vin from solar cell 10 and a sense current I from chopper circuit 100. PWM controller 300 detects a maximum power point of the solar cell 10 and controls switching transistor TS1 of chopper circuit 100 so as to maintain the DC voltage Vout output from of chopper circuit 100 at a constant level by causing the current drawn from solar cell 10 to follow the maximum power point detected by the controller.

The chopper circuit 100 includes an inductor L1 that is connected in series with a diode D1 between an output terminal of the solar cell 10 and load battery 200. Chopper circuit 100 also includes a voltage boosting rectifier circuit composed of switching transistor TS1, current sensing resistor Rs, diode D1 and capacitor C4, wherein diode D1 and capacitor C4 are connected in series with each other and in parallel with switching transistor TS1. Capacitors C2 and C3 are used to eliminate noise. The current sensing resistor Rs is used to sense the output current of solar cell 10.

Figure 7:
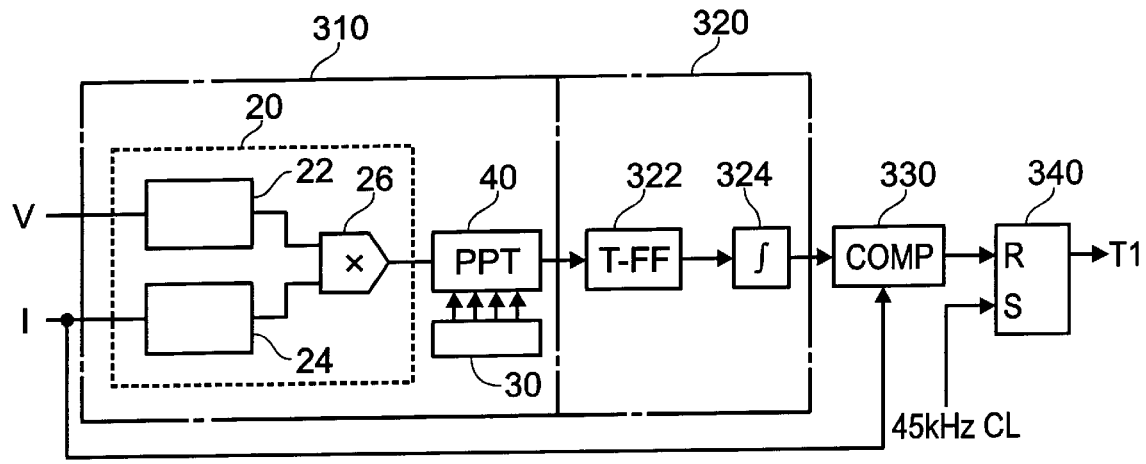
FIG. 7 is a more detailed circuit diagram of a pulse width modulation controller shown in FIG. 6.
Figure 8:
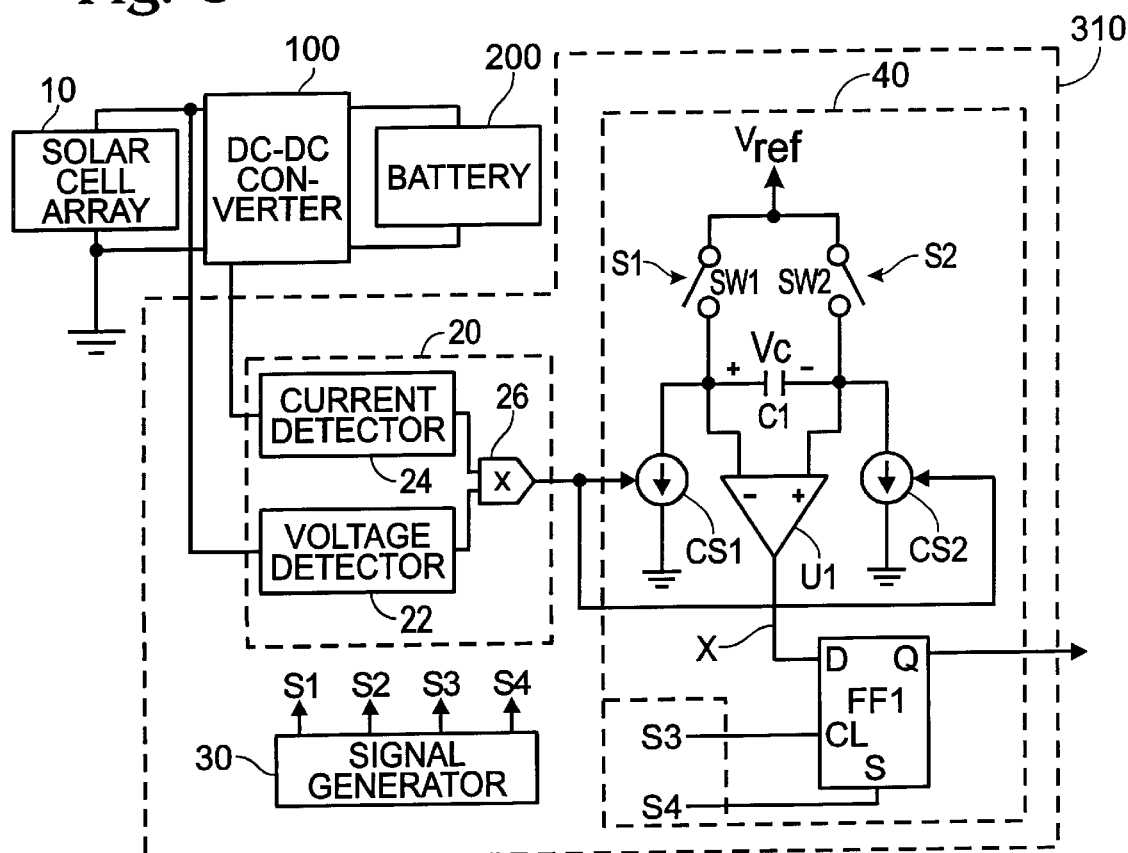
FIG. 8 is a more detailed circuit diagram of a maximum power point detector shown in FIG. 7.
Figure 9:
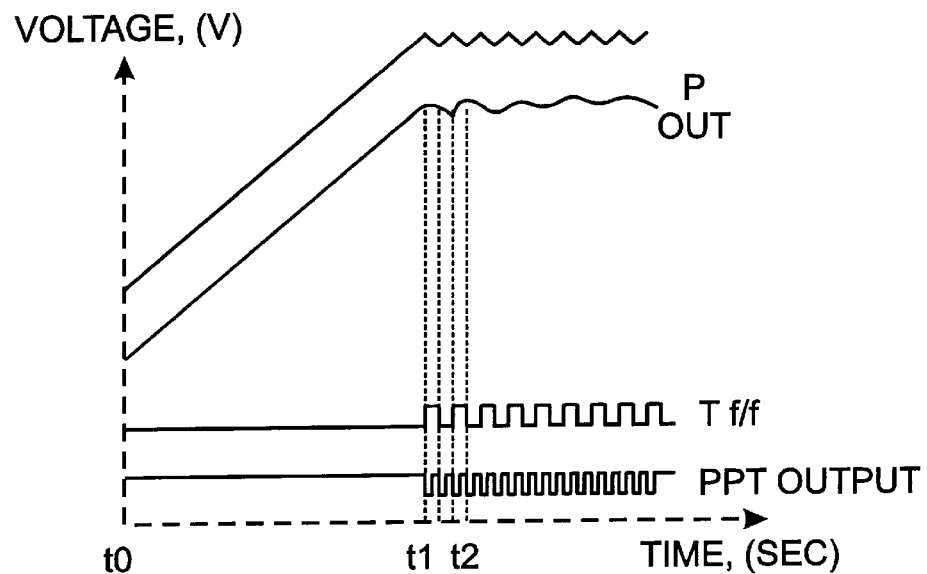
FIG. 9 is a waveform diagram showing the function of the pulse width modulation controller of FIG. 7.

The PWM controller 300 includes, as shown in FIG. 7, a maximum power point detector 310, a reference signal generator 320, a comparator 330, and a switching driver 340. The maximum power point detector 310 receives the output voltage Vin from solar cell 10 and sense current I from current sensing resistor Rs which it uses to detect the maximum power point in order to generate a maximum power point detecting signal SQ. The reference signal generator 320 integrates the maximum power point detecting signal SQ, and generates an integrated signal as a current command signal. The comparator 330 compares the current command signal with the sense current detecting signal $I_{RS}$, and generates an off control signal. The switching driver 340 turns on the switching transistor TS1 in response to a predetermined frequency, such as a clock signal CL of 45 KHz, and turns off the switching transistor TS1 in response to the off control signal.

The maximum power point detector 310 includes a power detector 20 for generating a power detecting signal responsive to Vin and $I_{RS}$, a signal generator 30 for generating sampling signals, and a maximum power point discriminator 40. The maximum power point discriminator 40 compares a previous quantity of charge with a current quantity of charge according to the power detecting signal Sp for a given time in response to a sampling signal from signal generator 30. If the previous quantity of charge is greater than the current quantity of charge, the maximum power point discriminator 40 determines that the output power from solar cell 10 has decreased, and generates a discriminating signal X.

The power detector 20 has a voltage detector 22 for generating a voltage detecting signal by detecting the output voltage of the solar cell 10, a current detector 24 for generating a current detecting signal by detecting the output current of the solar cell 10, and a multiplier 26 for generating the power detecting signal by multiplying the voltage detecting signal by the current detecting signal.

The sampling output of the signal generator 30 includes a first switching signal S1, a second switching signal S2, a clock signal S3, and a set signal S4. The first switching signal S1 has a "high" interval longer than a "low" interval during each given sampling period, such as T1, T2 and T3 shown in FIG. 7. The second switching signal S2 is shifted within the sampling period by the "high" interval of the first switching signal S1. The clock signal S3 has the same period as the first and second switching signals S1 and S2, but has a "high" interval during a given sampling period only during an interval in which the "high" intervals of the first and second switching signals S1 and S2 are overlapped. The set signal S4 has the same period as the first and second switching signals S1 and S2, and has a rising edge at each falling edge of the clock signal S3.

In the maximum power point discriminator 40, a first current source CS1 is connected between an inverting terminal (−) of a comparator U1 and a ground terminal, and varies its current in response to the power detecting signal generated from the power detector 20. A second current source CS2 having the same quantity of current as the first current source CS1 is connected between a noninverting terminal (+) of the comparator U1 and the ground terminal, and also varies its current in response to the power detecting signal. A capacitor C1 is connected between the inverting and noninverting terminals of the comparator U1. A first switch S1 connected between the inverting terminal (−) of the comparator U1 and a reference voltage Vref is turned on by the "high" interval of the first switching signal S1, and turned off by the "low" interval of the first switching signal S1. A second switch S2 connected between the noninverting terminal (+) of the comparator U1 and the reference voltage Vref is turned on by the "high" interval of the second switching signal S2, and turned off by the "low" interval of the second switching signal S2. A flip-flop FF1 latches the output X of the comparator U1 in response to the clock signal S3, and sets an output in response to the set signal S4.

In operation, the voltage Vin output from the solar cell 10 is applied to the chopper circuit 100 as shown in FIG. 6. While the switching transistor TS1 is turned on, the current output from solar cell 10 is stored in the inductor L1. Then, while switching transistor TS1 is turned off, the energy stored in the inductor L1 continues to flow to the battery 200.

The output voltage of the chopper circuit 100, Vout, is related to the voltage input from the solar cell 10, Vin, as described by the following equation (1):

$$\text{Vout}=\text{Vin}/(1-D) \qquad (1)$$

where D is a duty factor of the chopper circuit 100. If the voltage Vout output to the battery 200 is maintained at a constant level, then the operating voltage Vin of the solar cell 10 varies according to the duty factor D. Therefore, the operating voltage Vin can be maintained at a maximum power point voltage Vm of the solar cell 10 by adjusting the duty factor D. That is, if the output current of the solar cell 10 can be maintained at a maximum power point current Im, then the solar cell 10 can be operated at its maximum power point.

Since the output voltage Vin of the solar cell 10 varies according to the strength of the solar light and the ambient temperature, the maximum power point voltage Vm varies. Moreover, if the battery 200 is charged for a long period of time, the output voltage Vout will also vary. Therefore, the duty factor should be varied such that the input voltage of the chopper circuit 100 is maintained at the maximum power point of the solar cell 10 even if Vin and Vout vary.

Figure 11:
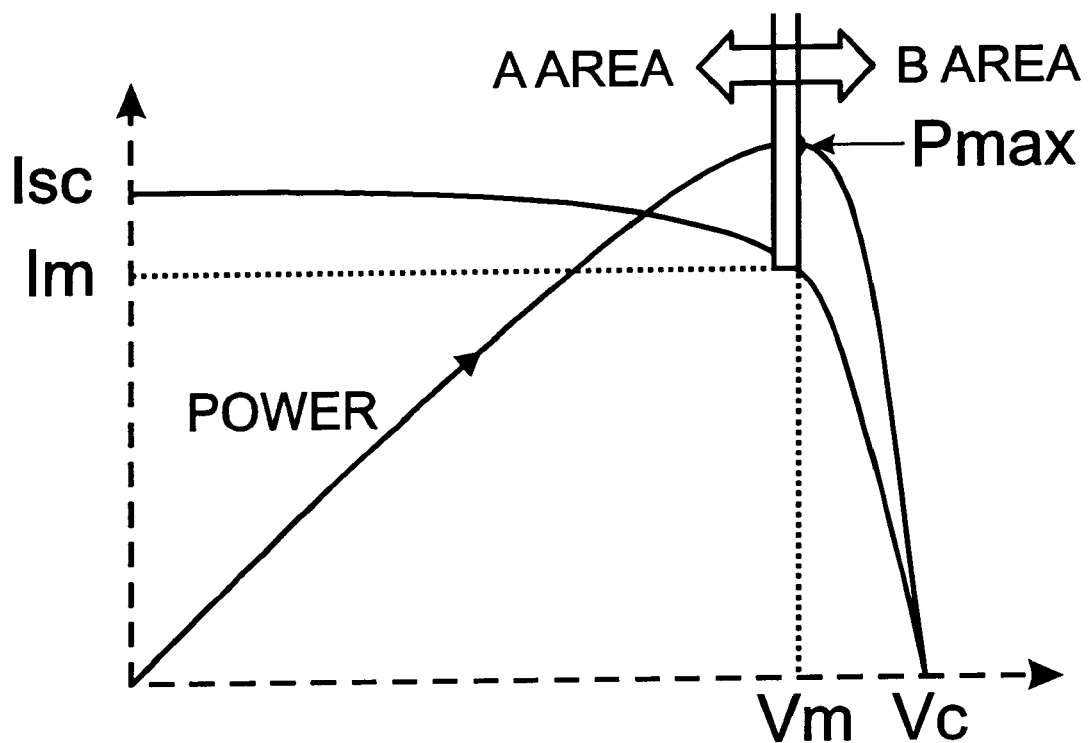
FIG. 11 is a graph showing the relationship between an output voltage, an output current and a power of a solar cell.

In detecting the maximum power point to follow up the maximum power point, the power detector 20 of the maximum power point detector 310 generates the power detecting signal Sp having the characteristic curve shown in FIG. 11 according to an output voltage Vopen and an output current Isc of the solar cell 10, wherein Isc indicates the current when the output terminal of the solar cell 10 is shorted and Vopen indicates the output voltage when the output terminal of the solar cell 10 is open and no current is drawn from solar cell 10. The power increases in the area A of the curve, and decreases in area B of the curve. The maximum power point Pmax is obtained from the product of the voltage Vm and the current Im.

The power detecting signal Sp is supplied to the maximum power point discriminator 40. Initially, since the first and second switching signals S1 and S2 are maintained at a "high" state as indicated in FIG. 7, the reference voltage Vref is supplied to the inverting and noninverting terminals of the comparator U1, and both terminals of the comparator U1 are maintained at an identical potential. If both terminals of the comparator U1 are at an identical potential, the output of the comparator U1 will be at a "low" state. In this state, a voltage Vc across both terminals of the capacitor C1 is maintained at 0.

During an interval Td1 in which the second switching signal S2 is set to a "low" state and the first switching signal S1 is a "high" state, the first switch SW1 is turned on and the second switch SW2 is turned off. Initially, the current I is supplied from the reference voltage. Then the current I is divided into the current flowing through the first current source CS1 and the current flowing through the capacitor C1 and the second current source CS2. If the capacitor C1 is gradually charged and reaches a first quantity of charge, the potential of the inverting terminal (−) of the comparator U1 is maintained at the reference voltage Vref. The potential of the noninverting terminal (+) of the comparator U1 is gradually lowered to −Vc in proportion to the capacitance of the capacitor C1. During an interval Td2 in which the first switching signal S1 is set to a "low" state and the second switching signal S2 is set to a "high" state, the first switch SW1 is turned off and the second switch SW2 is turned on. The potential of the noninverting terminal (+) of the comparator U1 is raised to the reference voltage Vref, and the potential of the inverting terminal (−) of the comparator U1 is raised to Vref+Vc. The quantity of charge on the capacitor C1 drains through the first current source CS1. Since the intervals Td1 and Td2 are the same, if the power detecting signal does not change, the current source CS1 responsive to the power detecting signal during the interval Td1 draws the same quantity of current as the current source CS2 responsive to the power detecting signal during the interval Td2. Hence, the quantity of charge stored on the capacitor C1 is the same as the quantity of charge drained from capacitor C1 for a given sampling period. At the end of the interval Td2, the potential of the inverting terminal (−) of the comparator U1 is identical to the reference voltage Vref. Therefore, the output of the comparator U1 is at a "low" state. The output of the flip-flop FF1, which was set to a "high" state by the set signal S4, is set to a "low" state by latching the output of the comparator U1 at the rising edge of the clock signal S3. That is, the average power detecting signal does not vary in size during the intervals Td1 and Td2.

As shown in FIG. 7, if the power detecting signal during the interval Td2 in a period T2 is larger than that during the interval Td1, the voltage Vc across the capacitor C1 becomes negative. In other words, the potential of the inverting terminal (−) of the comparator U1 becomes lower than the reference voltage Vref. Since the potential of the noninverting terminal (+) of the comparator U1 is maintained at the reference voltage Vref, and the potential of the inverting terminal (−) is maintained at a voltage level lower than the reference voltage Vref, the output of the comparator U1 is set to a "high" state. The output of the flip-flop FF1 is maintained at a "high" state. Consequently, the output power of the solar cell 10 increases during the present sampling period (T2) relative to the previous sampling period (T1).

In contrast, if the power detecting signal during the interval Td2 in a period T3 is smaller than that during the interval Td1, the voltage Vc across the capacitor C1 rises to a voltage level higher than the reference voltage Vref. The potential of the noninverting terminal (+) of the comparator U1 is maintained at the reference voltage Vref, and the potential of the inverting terminal (−) obtains a voltage level higher than the reference voltage Vref. That is, when the voltage Vc across the capacitor C1 becomes a positive value, the output of the comparator U1 is set to a "low" state. Since the flip-flop FF1 latches the output of the comparator U1 at the rising edge of the clock signal S3, the output of the flip-flop FF1 is also set to a "low" state. Consequently, the output power of the solar cell 10 decreases during the present sampling period (T3) relative to the previous sampling period (T2).

At the end of the interval Td2, the flip-flop FF1 latches the output of the comparator U1 on the rising edge of the clock signal S3, and starts to increase the power again at the rising set signal S4. The latched signal SQ appears at the terminal Q of flip-flop FF1. The flip-flop FF1 thus prevents the system from shutting down for an entire sampling period.

The maximum power point detecting signal SQ is supplied to T flip-flop 322, shown in FIG. 7, where it is divided by two. The divided signal is integrated in an integrator 324 to generate a command current signal. The comparator 330 compares the sense current $I_{RS}$, corresponding to the output of solar cell 10, to the integrated command current signal and generates an off control signal when the two signals are equal. When the switching transistor TS1 is turned on by the switching driver 340, to which the clock signal CL is supplied, the output current of the solar cell 10 flows into the current sensing resistor Rs through the switching transistor TS1. As a result, the sense current will have a ripple caused by the clock signal. Since the current detecting signal $I_{RS}$ of the current sensing resistor Rs is compared with the current command signal in comparator 330, the output current of solar cell 10 follow the current command signal. By such repeated operations, the current command signal increases until it reaches the maximum power point, and the output current of the solar cell also increases.

If the maximum power point is passed, the pulse width of detecting signal SQ of the maximum power point detector 310 will decrease, i.e. there will be a transition to a "low" state at time t1, and the output of the T flip-flop 322 will transition to a "high" state. Therefore, the output of the integrator 324 decreases and the number of pulses output to switching transistor TS1 decreases thereby decreasing the current drawn from solar cell 10 and increasing the input voltage to the chopper circuit 100, whereby the power output of the solar cell is increased. If the current drawn from the solar cell 10 decreases to the point that the power output of the cell decreases, then the pulse width of SQ will increase, i.e. there will be a longer transition to a "high" state and the output of T flip-flop 322 will transition to a "low" state. The output of integrator 324 will increase resulting in more pulses being output to switching transistor TS1, thereby increasing the current drawn by chopper 100 which will again increase the power output of the solar cell. If the maximum power point is again passed, such as at time t2, then detecting signal $S_Q$ will have a narrower pulse width, i.e. there will be a transition to a "low" state at time t2 and the output of the T flip-flop 322 will transition to a "high" state, and the output of the integrator 324 decreases. Hence, the output current of the solar cell will follow the output of the integrator 324 as it again decreases. By such repeated operations, the solar cell 10 continues to move around the maximum power point, and is operated around the maximum operating point.

As described above, since the maximum power point is determined in the present invention by comparing the average power value of the present sampling period with the average power value of the previous sampling period, wherein the sampling periods are of the same time duration, the maximum power point detecting signal is less responsive to noise or transient variations in the power during a given sampling period. Furthermore, since the maximum power point can be detected in the present invention by using relatively simple analog circuits, such as capacitors, comparators, switches, current sources, etc., the circuit of the present invention can be constructed at low cost.

While the present invention has been described and illustrated with reference to a preferred embodiment thereof, it is to be readily understood that the present invention is not limited to the embodiment, and various changes and modifications can be made therein without departing from the spirit and scope of the invention defined in the appended claims.

What is claimed is:

1. A solar cell power source device comprising:
   a solar cell for converting solar energy into a direct current (DC) output voltage;
   a chopper circuit for receiving the DC output voltage of said solar cell and converting the DC output voltage of said solar cell into a regulated DC voltage, wherein said chopper circuit comprises:
   an inductor coupled in series between an input terminal of the chopper circuit and an output terminal of the chopper circuit, wherein the input terminal of the chopper circuit is coupled to an output terminal of said solar cell and wherein the output terminal of the chopper circuit is configured to output the regulated DC voltage;
   a diode coupled between the inductor and the output terminal of the chopper circuit such that the diode permits current flow in the direction of the output terminal of the chopper;
   a switching transistor having first and second power terminals and a control terminal, wherein the first terminal is coupled between the inductor and the diode, and further wherein the control terminal is controlled by the pulse width modulation controller;
   a current sensing resistor coupled between the second power terminal of the switching transistor and the ground terminal; and
   a first capacitor coupled between the output terminal of the chopper circuit and the ground terminal;
   a battery configured to receive the regulated DC voltage from said chopper circuit; and
   a pulse width modulation controller for receiving the DC output voltage and an output current of said solar cell, detecting a maximum power point of said solar cell responsive to the DC output voltage and the output current, and controlling said chopper circuit so as to maintain the regulated DC voltage of said chopper circuit at a constant level by causing the output current of said solar cell to follow the detected maximum power point, wherein said pulse width modulation controller comprises:
   maximum power point detecting means for receiving the output voltage of said solar cell and a current detecting signal of said current sensing resistor, and detecting said maximum power point to generate a maximum power point detecting signal;
   reference signal generating means for integrating said maximum power point detecting signal in order to generate a current command signal;
   comparing means for comparing said current command signal with said current detecting signal in order to generate an off control signal; and
   switch driving means for turning on said switching transistor in response to a clock signal having a predetermined frequency, and turning off said switching transistor in response to said off control signal.

2. A solar cell power source device as claimed in claim 1, wherein said maximum power point detecting means comprises:
   power detecting means for generating a power detecting signal responsive to the output voltage and the output current of said solar cell;
   signal generating means for generating a sampling signal; and
   maximum power point discriminating means for comparing a previous quantity of charge with a current quantity of charge according to said power detecting signal for a given time in response to said sampling signal and determining that the output power of said solar cell has decreased when the previous quantity of charge is greater than the current quantity of charge in order to generate the maximum power point detecting signal.

3. A solar cell power source device as claimed in claim 2, wherein said power detecting means comprises:
   voltage detecting means for generating a voltage detecting signal by detecting the output voltage of said solar cell;
   current detecting means for generating said current detecting signal by detecting the output current of said solar cell; and
   multiplying means for generating said power detecting signal by multiplying said voltage detecting signal by said current detecting signal.

4. A solar cell power source device as claimed in claim 2, wherein said sampling signal of said signal generating means comprises:
   a first switching signal with a logic high interval longer than a logic low interval during one period;
   a second switching signal having the same period as the first switching signal and being shifted by the logic high interval of said first switching signal;
   a clock signal having the same period as said first and second switching signals and having a logic high interval only when the logic high intervals of said first and second switching signals are overlapped; and
   a set signal having the same period as said first and second switching signals and having a rising edge at a falling edge of said clock signal.

5. A solar cell power source device as claimed in claim 4, wherein said maximum power point discriminating means comprises:
   a comparator;
   a first current source connected between an inverting terminal of said comparator and the ground terminal, said first current source varying its output current in response to said power detecting signal;
   a second current source connected between a noninverting terminal of said comparator and the ground terminal, said second current source varying its output current in response to the power detecting signal and wherein the output current of the second current source is proportional to the output current of the first current source;
   a second capacitor connected between the inverting and noninverting terminals of said comparator;
   a first switch connected between the inverting terminal of said comparator and a reference voltage, said first switch being turned on by the logic high interval of said first switching signal, and turned off by the logic low interval of said first switching signal;
   a second switch connected between the noninverting terminal of said comparator and the reference voltage, said second switch being turned on by the logic high interval of said second switching signal, and turned off by the logic low interval of said second switching signal; and
   a flip-flop for latching the output of said comparator in response to said clock signal, and setting an output in response to said set signal.

6. A solar cell power source device as claimed in claim 1, wherein said reference signal generating means comprises:

dividing means for dividing said maximum power point detecting signal; and integrating means for generating a current command signal by integrating the output of said dividing means.

7. A pulse width modulation controller for sensing a power output of a power source and generating a switching control signal for a switching power converter, the pulse width modulation controller comprising:

a maximum power point detector configured to receive an output voltage from the power source and an output current signal corresponding to an output current from the power source and, responsive thereto, generate a maximum power point detecting signal, wherein the maximum power point detector determines the maximum power point detecting signal by comparing a first quantity of charge corresponding to the power output of the power source during a first time period with a second quantity of charge corresponding to the power output of the power source during a second time period;

a reference signal generator configured to receive the maximum power point detecting signal and integrate the maximum power point detecting signal to produce a current command signal;

a first comparator configured to compare the current command signal and the output current signal to generate an off control signal; and a switching driver configured to receive the off control signal and a first-clock signal and output the switching control signal, wherein the switching driver turns on the switching control signal responsive to the clock signal and turns off the switching control signal responsive to the off control signal.

8. The pulse width modulation controller of claim 7, wherein the maximum power point detector further comprises:

a power detecting circuit configured to receive said output voltage from the power source and said output current signal corresponding to said output current from the power source and, responsive thereto, generate a power detecting signal corresponding to the power output;

a signal generator configured to generate first and second sampling signals, wherein the first and second sampling signals have a predetermined period and a predetermined duty cycle, and wherein the first sampling signal is out of phase with the second sampling signal; and a power point discriminator configured to sample the power detecting signal responsive to the first sample signal to obtain the first quantity of charge, sample the power detecting signal responsive to the second sample signal to obtain the second quantity of charge, and compare the first and second quantities of charge in order to generate the maximum power point detecting signal.

9. The pulse width modulation controller of claim 8, wherein:

the signal generator is further configured to generate the clock signal having the same period as the first and second switching signals and having a logic high interval only during an interval in which logic high intervals of the first and second switching signals are overlapped, and a set signal having the same period as said first and second switching signals and having a rising edge at a falling edge of the clock signal; and the power point discriminator further comprises:

a second comparator, a first current source connected between an inverting terminal of the second comparator and a ground terminal, the first current source varying its current in response to the power detecting signal;

a second current source connected between a noninverting terminal of the second comparator and the ground terminal, the second current source varying its current in response to the power detecting signal, wherein the first and second current sources conduct substantially the same quantity of current in response to the power detecting signal;

a capacitor connected between the inverting and noninverting terminals of said comparator;

a first switch connected between the inverting terminal of the second comparator and a reference voltage source, said first switch being turned on by the logic high interval of the first sampling signal, and turned off by a logic low interval of the first sampling signal;

a second switch connected between the noninverting terminal of the second comparator and the reference voltage source, the second switch being turned on by the logic high interval of the second switching signal, and turned off by a logic low interval of the second switching signal; and a flip-flop for latching an output of the second comparator in response to the clock signal, and setting the output in response to the set signal.

10. The pulse width modulation controller of claim 7, wherein the power detecting circuit further comprises:

a voltage detector configured to receive the output voltage from the power source and, responsive thereto, output a voltage detecting signal;

a current detector configured to receive the output current signal and, responsive thereto, output a current detecting signal; and a multiplier configured to multiply the voltage detecting signal and the current detecting signal in order to generate the power detecting signal.

11. The pulse width modulation controller of claim 7, wherein the reference signal generator further comprises:

a toggle flip-flop configured to receive the maximum power point detecting signal and, responsive thereto, output a divided signal; and an integrator configured to receive the divided signal and output the current command signal responsive thereto.

12. A method for maximizing a power output from a power supply, the method comprising the steps:

comparing a first quantity of charge corresponding to the power output of the power source during a first time period with a second quantity of charge corresponding to the power output of the power source during a second time period to generate a maximum power point detecting signal;

integrating the maximum power point detecting signal to produce a current command signal;

comparing the current command signal to an output current signal corresponding to an output current of the power supply in order to generate an off control signal; and turning on a switch in a switching power converter responsive to a clock signal; and turning off the switch in the switching power converter responsive to the off control signal.

13. The method for maximizing a power output from a power supply of claim 12, wherein the step of comparing a first quantity of charge corresponding to the power output of the power source during a first time period with a second quantity of charge corresponding to the power output of the power source during a second time period to generate a maximum power point detecting signal includes the steps:

multiplying the output current signal by an output voltage of the power supply to generate a power detecting signal;

generating first and second sampling signals, wherein the first and second sampling signals have a predetermined period and a predetermined duty cycle, and wherein the first sampling signal is out of phase with the second sampling signal;

sampling the power detecting signal responsive to the first sampling signal to obtain the first quantity of charge;

sampling the power detecting signal responsive to the second sampling signal to obtain the second quantity of charge; and comparing the first and second quantities of charge in order to generate a discriminating signal;

generating said clock signal having the same period as the first and second sampling signals and having a logic high interval only during an interval in which logic high intervals of the first and second sampling signals are overlapped;

clocking the discriminating signal onto the maximum power point detecting signal responsive to the clock signal;

generating a set signal having the same period as said first and second switching signals and having a rising edge at a falling edge of the clock signal; and setting the maximum power point detecting signal responsive to the set signal.

14. The method for maximizing a power output from a power supply of claim 13, wherein:

the step of sampling the power detecting signal responsive to the first sampling signal to obtain the first quantity of charge further comprises charging one side of a capacitor with the power detecting signal responsive to the first sampling signal;

the step of sampling the power detecting signal responsive to the second sampling signal to obtain the second quantity of charge further comprises discharging an other side of the capacitor with the power detecting signal responsive to the second sampling signal; and the step of comparing the first and second quantities of charge in order to generate a discriminating signal further comprises comparing a charge on the one side of the capacitor to the charge on the other side of the capacitor to obtain the discriminating signal.

15. The method for maximizing a power output from a power supply of claim 12, wherein the step of integrating the maximum power point detecting signal to produce a current command signal further comprises:

dividing the maximum power point detecting signal to generate a divided signal; and integrating the divided signal to generate the current command signal.

* * * * *

UNITED STATES PATENT AND TRADEMARK OFFICE
CERTIFICATE OF CORRECTION

PATENT NO.    : 5,932,994
DATED         : August 3, 1999
INVENTOR(S)   : Jo et al.

It is certified that error appears in the above-identified patent and that said Letters Patent is hereby corrected as shown below:

Column 2,
Line 60, "output from of" should read -- output from --.

Column 3,
Lines 13 and 15, "SQ" should read -- SQ --.
Line 48, "FIG.7" should read -- FIG. 10 --.

Figure 10:
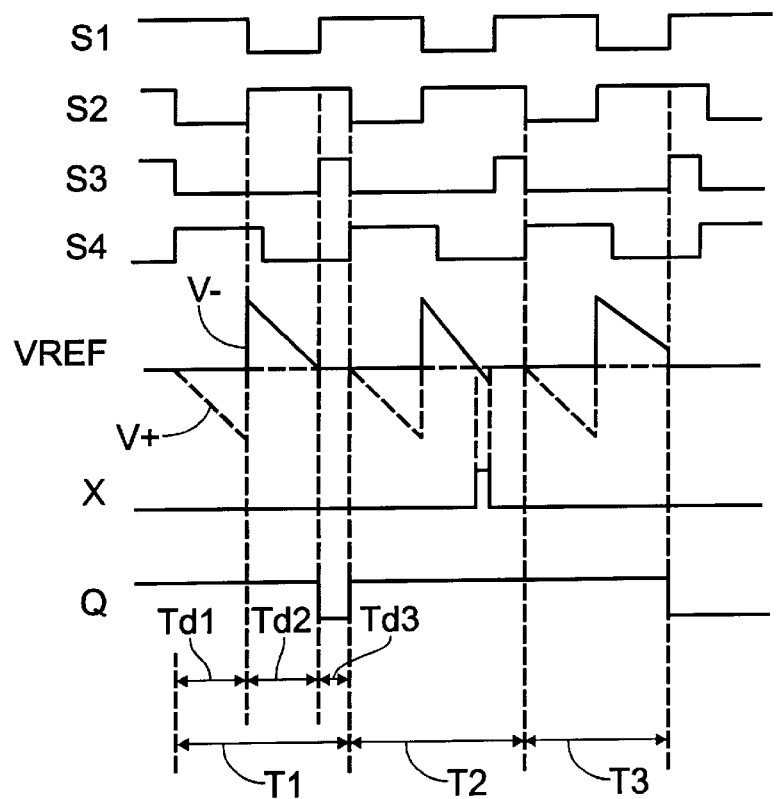
FIG. 10 is a timing chart showing a signal waveform of each portion of FIG. 8.

Column 4,
Line 58, "FIG.7" should read -- FIG. 10 --.

Column 5,
Line 36, "FIG.7" should read -- FIG. 10 --.

Column 6,
Lines 2, 5, 25 and 35, "SQ" should read -- SQ --.

Column 9,
Line 31, "first-clock signal" should read -- clock signal --.

Signed and Sealed this

Fifth Day of November, 2002

*Attest:*

JAMES E. ROGAN
*Attesting Officer*    *Director of the United States Patent and Trademark Office*